Figure 1:
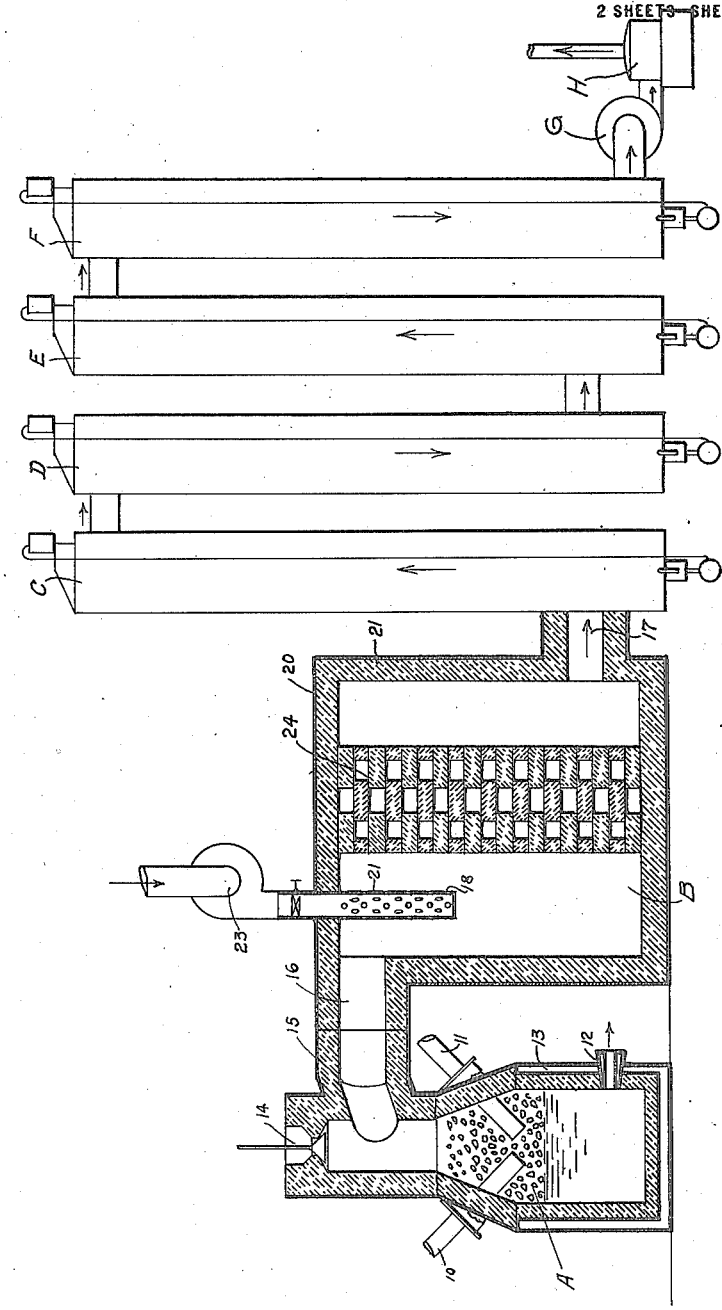

I. HECHENBLEIKNER.
PROCESS AND APPARATUS FOR OXIDIZING GASES.
APPLICATION FILED FEB. 5, 1914.

1,249,392.

Patented Dec. 11, 1917.
2 SHEETS—SHEET 1.

WITNESSES:
Edgar A. Van Deusen
Hugh J. Campbell

INVENTOR
I. Hechenbleikner.
BY
Russell S. Smart
ATTORNEY

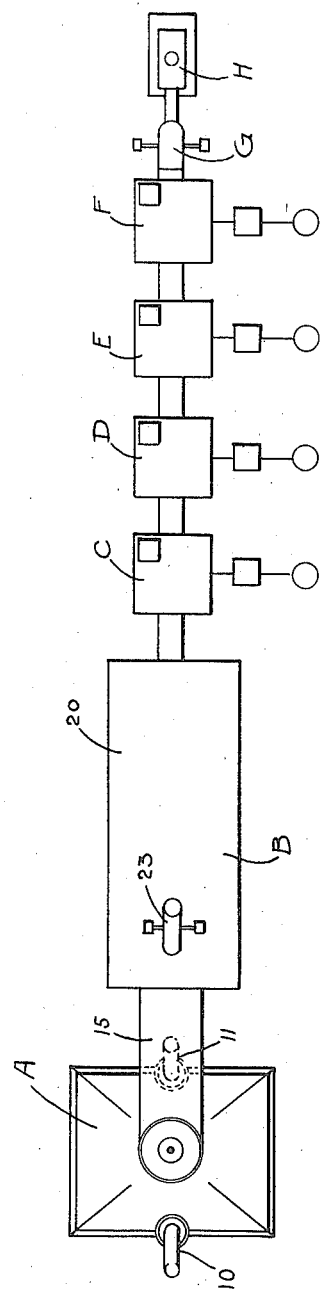

UNITED STATES PATENT OFFICE.

INGENUIN HECHENBLEIKNER, OF CHARLOTTE, NORTH CAROLINA, ASSIGNOR TO SOUTHERN ELECTRO CHEMICAL COMPANY, OF NEW YORK, N. Y., A CORPORATION OF NEW JERSEY.

PROCESS AND APPARATUS FOR OXIDIZING GASES.

1,249,392.   Specification of Letters Patent.   Patented Dec. 11, 1917.

Application filed February 5, 1914. Serial No. 816,830.

*To all whom it may concern:*

Be it known that I, INGENUIN HECHENBLEIKNER, subject of the Emperor of Austria, and resident of Charlotte, in the county of Mecklenburg and State of North Carolina, have invented certain new and useful Process and Apparatus for Oxidizing Gases, of which the following is a specification.

This invention relates to an improved process of and apparatus for oxidizing gases and vapors and particularly of oxidizing phosphorus to produce phosphorus pentoxid or phosphoric acid.

In the process of manufacturing phosphoric acid in the electric furnace in which natural phosphate rock is heated with silicious material and carbon, it is essential that the vapors containing phosphorus and phosphoric acid formed and expelled should be very thoroughly commingled with air, in order that no phosphorus may escape oxidation.

According to the present process a counter current of air or oxygen is produced in a moving stream of the gases or vapors to be oxidized, preferably in a plurality of jets to produce a swirling action, and the combined stream of gases and oxygen is further broken up by transmission through tortuous passage ways. The process is particularly useful, as stated, in the manufacture of phosphoric pentoxid or phosphoric acid, but is not confined to this. A suitable apparatus for carrying out the process is shown in the drawings accompanying this specification.

In the drawings Figure 1 is a front elevation partly in section showing the essential features of a plant for manufacturing phosphoric acid under the present invention.

Fig. 2 is a plan view of the apparatus shown in Fig. 1.

In the drawings like characters of reference represent corresponding parts in all the figures.

Referring to the drawings, A represents a suitable electric furnace B, an oxidizing chamber, C, D, E, and F a plurality of absorption towers connected in series, G a suitable draft producing fan and H a gas scrubber.

The electric furnace A is of any suitable construction and, as illustrated does not form part of the present invention. The furnace includes electrodes 10 and 11, a tap hole 12, water jacket 13, charging bell 14 and outlet 15.

The oxidizing chamber B, which is used in carrying out the process of the present invention, is, in the embodiment illustrated, in the form of a rectangular chamber, having an inlet 16 at the top of one side and an outlet 17 near the bottom of the opposite side. The shape of the chamber is not material. It might be equally well constructed of round or polygonal shape. It may also be constructed as a structural part of the stack or flue from the furnace.

It is desirable for the sake of efficiency in the process that the inlet should be near the top and the outlet near the bottom, by reason of the fact that the oxidizing reaction heats the gases, thereby tending to cause them to rise. The suction being exerted in the reverse direction however causes the gases to pass downwardly and thus produces a better mixture. The oxidizing chamber may be constructed of any suitable material which will resist the reactions taking place therein. I have shown a gas tight steel casing 20, having a fire brick lining 21.

The air or oxygen is introduced through some distributing nozzle 18, which projects across the path of the incoming gases. In the form illustrated the nozzle is constructed from a metallic pipe projecting across the inlet 16 a distance inwardly from the opening of the inlet 16.

In order to produce a thorough mixture in the stream of gases to be oxidized, the oxygen is introduced in such a way as to produce a swirling action as by producing a counter current of oxygen. With this purpose in view the end of the nozzle 18 is closed and the sides are formed with a plurality of perforations 21, which act as nozzles through which the oxygen may discharge in fine streams or jets some in a direction substantially at right angles to the stream of phosphorus containing vapors and gases, and others counter or in the reverse direction to the stream of gas. The quantity of oxygen introduced is regulated or measured by suitable means, such as the blower 23, which also serves as a means for forcing the current of oxygen through the perforations 21 and against the stream of gas, as already explained.

The stream of gases into which the oxygen has been injected is adapted to be further broken up by causing it to pass through the tortuous passage-ways and to accomplish this in the apparatus illustrated, I have shown a partition 24 of brick checker-work located in the chamber B between the inlet 21 and the outlet 17 through the tortuous passage ways of which gas is forced to pass. The absorption towers C, D, E and F are of any usual design, as is also the scrubber H.

The process as applied to the manufacture of phosphoric acid may now be briefly described.

The furnace mixture consisting of natural phosphate rock, silicious material and carbon is introduced into the furnace in suitable proportions to produce phosphorus after the following well known reaction formula:

$$Ca_3P_2O_8 + 3SiO_2 + 5C = 3CaSiO_3 + 5CO + P_2.$$

The gaseous products of this reaction consisting mainly of phosphorus, carbon monoxid and a small portion of phosphoric acid produced by air in the feed and drawn in through small leaks in the furnace, are drawn through the outlet 15 by the suction of the fan G. These furnace gases are carried from the furnace to the oxidation chamber B and there oxidized into carbon dioxid and phosphoric pentoxid, according to the formula $$CO + O = CO_2, \quad P_2 + O_5 = P_2O_5.$$

As already explained the counter current of incoming oxygen and the finely divided jets will cause a swirling action to take place in the stream of gases, which will thoroughly mingle the same and the stream will be further broken up and the gases mixed by the checker-work partition 24. To insure that complete oxidation takes place, it is also desirable that an excess of oxygen should be introduced and also that the temperature of the furnace gases at the time of oxidation should be relatively high, say above 300° centigrade.

The furnace gases leaving the oxidation chamber and consisting mainly of phosphoric pentoxid ($P_2O_5$) and carbon dioxid pass successively through the absorption towers C, D, E and F, fan G and scrubber H.

In the absorption towers the phosphoric acid is conveniently absorbed on the countercurrent system, that is to say that the acid is strengthened from the first to the last tower and the gases are weakened from the first to the last tower, the water for the absorption of the $P_2O_5$ being introduced in the last tower and being pumped successively through the remaining towers. The details of the absorption scheme, however, do not form part of the present invention and the absorption as far as this invention is concerned might take place in any manner now practised in the art. The scrubber 8 may also be of any suitable convenient type.

The term oxygen is intended not only to include oxygen in its pure form, but also oxygen mingled with other gases such as nitrogen, in the form of air or oxygen bearing chemical combination suitable for the purpose.

Having thus described my invention what I claim is:

1. The herein described process of oxidizing a flowing stream of vapor or gas which comprises distributing oxygen in a plurality of fine streams, certain of which fine streams are counter in direction to the flowing stream.

2. The herein described process of oxidizing a flowing stream of vapor or gas which comprises distributing oxygen in a plurality of fine streams, certain of which fine streams are counter in direction to the flowing stream and others at right angles thereto.

3. The herein described process of oxidizing a gas or vapor which comprises producing a stream of the gas or vapor and introducing a jet of oxygen into the moving stream in such a direction as to produce a swirling action.

4. The herein described process of oxidizing a gas or vapor which comprises, passing the gas or vapor through a chamber and subjecting the gas or vapor while in the chamber to a counter current of oxygen.

5. The herein described process of oxidizing a gas or vapor which comprises, passing the gas or vapor through a chamber subjecting the gas or vapor while in the chamber to a counter current of oxygen in such a way as to produce a swirling action.

6. The herein described process of oxidizing a gas or vapor which comprises passing the gas or vapor through a chamber and subjecting the gas or vapor while in the chamber to a plurality of fine streams of oxygen at such an angle as to produce a swirling action.

7. The herein described process of oxidizing a gas or vapor which comprises subjecting the flowing gas or vapor to a counter current of oxygen produced by a plurality of finely distributed streams, some of which are discharged at substantially right angles to the flowing gas or vapor.

8. The herein described process of oxidizing a gas or vapor which comprises subjecting a flowing stream of gas vapors to a counter current of oxygen and subsequently breaking up the combined stream of gases and vapors.

9. The herein described process of oxidizing a gas or vapor which comprises passing the gas or vapor through a chamber and subjecting the gas while in the chamber to a counter current of oxygen and breaking up the combined stream.

10. The herein described process of oxidizing a gas or vapor which comprises passing the gas or vapor through a chamber subjecting the gas or vapor while in the chamber to a counter current of oxygen and breaking up the combined stream by passing the same through a checker-work partition.

11. The herein described process which comprises passing phosphorus vapor through a chamber and subjecting it while in the chamber to a counter current of oxygen.

12. The herein described process of oxidizing phosphorus vapor which comprises passing the vapor through a chamber, introducing a plurality of fine streams of oxygen into the chamber in a direction counter to that in which the vapor is moving, and subsequently breaking up the combined stream while in the chamber.

13. The herein described process of oxidizing a gas or vapor which comprises in introducing the same near the top of a chamber and withdrawing the same from the bottom of the chamber and subjecting the gas while in the chamber to a counter current of oxygen near the top of the chamber.

14. The herein described process of oxidizing a gas or vapor which comprises introducing the same near the top of a chamber and withdrawing the same from the bottom of the chamber and subjecting the gas or vapor while in the chamber to a counter current of oxygen near the top of the chamber, and breaking up the combined stream in the chamber.

15. The herein described process of oxidizing a gas or vapor which comprises drawing the same downwardly through a chamber and introducing an oxidizing current in the upper part of the chamber in such a direction as to produce a swirling action.

16. The herein described apparatus for oxidizing a gas comprising a chamber having an inlet and an outlet, a nozzle extending in the path of the incoming gases and formed with a closed end and a plurality of distributing orifices in the side thereof.

17. An apparatus for oxidizing gases or vapors which comprises a chamber having an inlet and an outlet, a nozzle extending into the path of the incoming gases and formed with a closed end and a plurality of distributing orifices in the side thereof, and a partition with tortuous passage ways extending between the inlet and outlet of the chamber.

18. An apparatus for oxidizing gases or vapors comprising a chamber having an inlet and an outlet, a partition between the inlet and the outlet forming tortuous passage ways, and a gas introducing nozzle between the inlet and the partition.

19. The herein described apparatus for oxidizing a gas or vapor which comprises a chamber having an inlet and an outlet, a partition between the inlet and the outlet formed with tortuous passage ways and a gas introducing nozzle between the inlet and the partition, said nozzle being adapted to discharge the oxygen in a direction counter to that in which the gas is adapted to pass through the chamber.

Signed at New York city, in the county of New York and State of New York this 3rd day of February A. D. 1914.

INGENUIN HECHENBLEIKNER.

Witnesses:
RUSSELL B. SMART,
RICHARD PFAEHLER.